(12) United States Patent
Fukuda

(10) Patent No.: US 7,108,215 B2
(45) Date of Patent: Sep. 19, 2006

(54) MAGNETIC TAPE CARTRIDGE

(75) Inventor: Taizo Fukuda, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/105,100

(22) Filed: Apr. 13, 2005

(65) Prior Publication Data

US 2005/0236506 A1    Oct. 27, 2005

(30) Foreign Application Priority Data

Apr. 15, 2004   (JP) ............................. 2004-120937

(51) Int. Cl.
 *G03B 23/02* (2006.01)
(52) U.S. Cl. ..................... 242/338.1; 242/348; 360/132
(58) Field of Classification Search ................ 242/338, 242/338.1, 343, 343.1, 343.2, 348, 348.2, 242/345.2; 360/132
See application file for complete search history.

(56) References Cited

U.S. PATENT DOCUMENTS 6,462,905 B1 * 10/2002 Takahashi et al. ........... 360/132
6,499,686 B1 * 12/2002 Tsuyuki et al. ............. 242/348
6,581,866 B1 *  6/2003 Tsuyuki et al. ............. 242/348
6,700,742 B1 *  3/2004 Tsuyuki et al. .......... 242/338.1
6,814,326 B1 * 11/2004 Tsuyuki et al. ............. 242/348
6,913,217 B1 *  7/2005 Ishihara ................... 242/338.1
6,955,317 B1 * 10/2005 Ishihara ................... 242/338.1
2001/0028010 A1 * 10/2001 Tsuyuki et al. .......... 242/338.1
2002/0190149 A1 * 12/2002 Tsuyuki et al. .......... 242/338.1
2003/0057309 A1 *  3/2003 Tsuyuki et al. .......... 242/338.1
2004/0061013 A1 *  4/2004 Ishihara ..................... 242/348

* cited by examiner

*Primary Examiner*—William A. Rivera
(74) *Attorney, Agent, or Firm*—Frommer Lawrence & Haug LLP; William S. Frommer

(57) ABSTRACT

A magnetic tape cartridge which includes a single tape reel on which magnetic tape is wound on the outer peripheral surface of a reel hub thereof, rotatably housed in the inside of a cartridge case; and a reel lock member for inhibiting the rotation of the tape reel, provided movably in an axial direction of the tape reel between a lock position and a lock release position, in the inside of the reel hub; wherein a position restriction rib opposed to the outer periphery of the reel lock member for restricting an axial deviation of the reel lock member from the axial position of the tape reel is formed discontinuously with the inner peripheral surface of the reel hub on the top surface of the bottom of the reel hub in the inside of the reel hub.

3 Claims, 6 Drawing Sheets

MAGNETIC TAPE CARTRIDGE

CROSS REFERENCE TO RELATED APPLICATIONS

The present invention contains subject matter related to Japanese Patent Application JP2004-120937, filed in the Japanese Patent Office on Apr. 15, 2004, the entire contents of which being incorporated herein by reference.

BACKGROUND OF THE INVENTION

1. Field of the Invention

The present invention relates to a magnetic tape cartridge having a structure which inhibits the rotation of a tape reel on which magnetic tape is wound, when the cartridge is not in use.

2. Description of Related Art

As a magnetic tape cartridge which is used as an external recording medium for computers and the like, a magnetic tape cartridge of the type in which magnetic tape is wound on a single reel and this reel is rotatably housed in a cartridge case has heretofore been known. This kind of magnetic tape cartridge is used for saving data of computers and the like, and needs to have a structure which is not disabled by impact such as dropping, because a huge amount of important information is recorded on the magnetic tape cartridge.

The above-mentioned single reel type of magnetic tape cartridge is provided with a reel lock mechanism which inhibits the rotation of the tape reel in order to prevent the slack of the magnetic tape due to the rotation of the tape reel in the inside of the cartridge case when the magnetic tape cartridge is not in use. This reel lock mechanism has different constructions corresponding to the kinds of magnetic tape cartridges, and, for example, an LTO (linear tape open cartridge) type of magnetic tape cartridge has a reel lock mechanism which is incorporated in the inside of the reel hub of a tape reel as shown in FIGS. 7 to 9.

FIG. 7 is an exploded cross-sectional side view of this kind of related art magnetic tape cartridge 101, FIG. 8 is a cross-sectional side view of the essential sections of the magnetic tape cartridge 101 which is not in use, and FIG. 9 is a cross-sectional side view of the essential sections of the magnetic tape cartridge 101 which is in use. In the magnetic tape cartridge 101, a single tape reel 105 on which magnetic tape (not shown) is wound is housed in the inside of a cartridge case 104 constituted by a top shell 102 and a bottom shell 103 which are joined together.

The tape reel 105 includes a reel hub 106 which serves as a core on which magnetic tape is wound, a top flange 107 joined to the top end of the reel hub 106, and a bottom flange 108 formed integrally with the bottom end of the reel hub 106. A ring-shaped chucking gear 109, which is engaged with a reel-rotating drive shaft of a tape drive apparatus (recording/reproduction apparatus) which is not shown, is formed on the central section of the outside surface of the bottom of the reel hub 106, and is exposed to the outside via an opening 110 formed in the central section of the bottom shell 103. On the inner peripheral side of the chucking gear 109, a ring-shaped metal plate 111 for magnetically securing the tape reel 105 to the reel-rotating drive shaft is fixed to the outside surface of the bottom of the reel hub 106 by insert molding.

A reel lock mechanism for inhibiting the rotation of the tape reel 105 when the magnetic tape cartridge 101 is not in use is provided in the inside of the reel hub 106. The reel lock mechanism includes geared walls 112 formed to extend uprightly from the top surface of the bottom of the reel hub 106, a lock member 113 having engagement teeth 113a which mesh with gear sections 112a formed on the top ends of the respective geared walls 112, a spider (reel lock release member) 114 for releasing the engagement of the geared walls 112 and the reel lock member 113, and a reel spring 115 disposed between the inside surface of the top shell 102 and the top surface of the reel lock member 113 and operative to urge the tape reel 105 toward the bottom shell 103 via the reel lock member 113.

The geared walls 112 have arc-like shapes as viewed in top plan view, and are respectively formed on the top surface of the bottom of the reel hub 106 at three locations spaced equidistantly apart from one another around the same circumference centered at the axis of the reel hub 106. The engagement teeth 113a of the reel lock member 113 which are opposed to the gear sections 112a of the geared walls 112 are formed on the bottom surface of the reel lock member 113 in a ring-like shape as viewed in top plan view, and are constantly urged by the reel spring 115 in the direction in which the engagement teeth 113a are brought into engagement with the gear sections 112a. A fitting projection 113c which has an approximately cross-like shape as viewed in top plan view is formed on the top surface of the reel lock member 113, and a fitting recess 102a which has an approximately cross-like shape as viewed in top plan view and in which the fitting projection 113c is fitted is formed at an approximately central section of the inside surface of the top shell 102.

The spider 114 has an approximately triangular shape, and is disposed between the bottom of the reel hub 106 and the reel lock member 113. A total of three legs 114a are formed on the bottom surface of the spider 114 so as to project downwardly from three vertices of the approximately triangular shape of the spider 114, respectively. When the cartridge is not in use, the three legs 114a are inserted in position between gears of the chucking gear 109 via insertion holes 106a formed in the bottom of the reel hub 106. A support surface 114b which supports a sliding contact section 113b having an arc-like cross-sectional shape formed to project from an approximately central section of the bottom surface of the reel lock member 113 is disposed on an approximately central section of the top surface of the spider 114.

When the related art magnetic tape cartridge 101 constructed in the above-mentioned manner is not in use, the reel lock member 113 is located at a lock position as shown in FIG. 8, and is forced by the urging force of the reel spring 115 so as to press the tape reel 105 against the bottom shell 103 and so as to engage the engagement teeth 113a with the gear sections 112a of the geared walls 112 and inhibit the rotation of the tape reel 105.

On the other hand, when the magnetic tape cartridge 101 is in use, the reel-rotating drive shaft of the tape drive apparatus which is not shown is brought into engagement with the chucking gear 109, whereby the legs 114a of the spider 114 inserted in the positions between gears of the chucking gear 109 are pressed upwardly into the inside of the cartridge case 104. Accordingly, the reel lock member 113 is moved to the lock release position shown in FIG. 9 against the urging force of the reel spring 115, so that the engagement between the gear sections 112a and the engagement teeth 113a is released.

Then, the tape reel 105 is integrated with the reel-rotating drive shaft by the action of magnetic attraction between the metal plate 111 and the reel-rotating drive shaft, whereby the tape reel 105 is rotationally driven via the chucking gear 109. At this time, the rotational operation of the reel lock member 113 is restricted by the action of fitting between the fitting projection 113c and the fitting recess 102a of the top shell 102, and the spider 114 rotates together with the tape reel 105 by means of a sliding contact action produced by the state of point contact between the support surface 114b disposed on the top surface of the spider 114 and the sliding contact section 113b of the reel lock member 113.

A related art document relating to the invention of the above-mentioned application is as follows:

Japanese Patent Application Publication No. 2002-343058.

When the above-mentioned magnetic tape cartridge 101 is not in use, the movement of the tape reel 105 in the horizontal direction of the cartridge case 104 (in the radius direction of the tape reel 105 is restricted not only by the reel lock action of the reel lock member 113 but also by the force of the reel spring 115 to press the tape reel 105 against the bottom shell 105 as well as the fitting action between the outer periphery of the chucking gear 109 and the opening 110 of the bottom shell 103.

However, if, for example, a dropping impact is applied to the magnetic tape cartridge 101, the tape reel 105 of heavy weight on which magnetic tape is wound shows an unstable behavior in the inside of the cartridge case 104. If an impact exceeding a certain magnitude is applied to the magnetic tape cartridge 101, the tape reel 105 may be moved in a horizontal direction relative to the cartridge case 104 to such an extent that the outer periphery of the chucking gear 109 climbs over the peripheral taper surface of the opening 110 and the engagement between the reel lock member 113 and the geared walls 112 is released. In this case, a deviation of not less than one pitch in gear engagement occurs between the gear sections 112a of the tape reel 105 and the engagement tooth 113a of the reel lock member 113, so that a deviation occurs between the axis of the tape reel 105 and the axis of the reel lock member 113.

If a deviation occurs in this manner between the axis of the tape reel 105 and the axis of the reel lock member 113, when the magnetic tape cartridge 101 is to be loaded and used in a tape drive apparatus, the chucking gear 109 is located in the state of being displaced with respect to the opening 110 in the direction of the deviation, so that there occurs the trouble that the reel-rotating drive shaft fails to appropriately engage with the chucking gear 109 and invokes the disablement of the magnetic tape cartridge 101 or causes the malfunction of the tape drive apparatus.

To address this trouble, for example, the above-cited Patent Document 1 discloses a construction in which a plurality of position restriction ribs 120 which are opposed to the outer periphery of the reel lock member 113 and restrict the axial deviation of the reel lock member 113 from the axial position of the tape reel 105 are formed to project, respectively, from locations spaced equidistantly apart from one another around the inner peripheral surface of the reel hub 106, as shown in FIG. 10. According to this construction, the relative movement of the tape reel 105 with respect to the cartridge case 104 due to, for example, dropping impact can be restricted by the action of abutment between the position restriction ribs 120 and the periphery of the reel lock member 113, whereby the deviation between the axis of the tape reel 105 and the axis of the reel lock member 113 can be restrained.

However, the construction described in the above-cited Patent Document 1 has the drawback that since the position restriction ribs 120 are formed continuously with the inner peripheral surface of the reel hub 106 made of an injection molded product of synthetic resin material, sink marks (depressions) are formed in the outer periphery of the reel hub 106 at locations corresponding to the formation positions of the position restriction ribs 120, so that the flatness of the outer peripheral surface of the reel hub 106 is damaged.

As mentioned above, the reel hub 106 constitutes a core on which magnetic tape is wound with multiple turns, so that if the flatness of the outer peripheral surface of the reel hub 106 which is a winding surface for magnetic tape is damaged, the inside layers of wound magnetic tape in particular undergo deformation.

If the flatness of the outer peripheral surface of the reel hub 106 deteriorates, the roundness of the reel hub 106 is impaired, so that rattling such as axial shaking of the tape reel 105 during high-speed rotation thereof increases and the stable runnability of magnetic tape cannot be ensured.

SUMMARY OF THE INVENTION

The present invention has been made in view of the above-identified, and intends to provide a magnetic tape cartridge having a structure capable of preventing the deviation in axial position between a tape reel and a reel lock member without damaging the flatness of the outer peripheral surface of a reel hub.

The present invention provides a magnetic tape cartridge in which a position restriction rib which is opposed to the outer periphery of a reel lock member and restricts the axial deviation of a reel lock member from the axial position of a tape reel is formed discontinuously with the inner peripheral surface of the reel hub on the top surface of the bottom of the reel hub.

According to the present invention, the position restriction rib which restricts the deviation in axial position between the tape reel and the reel lock member is formed discontinuously with the inner peripheral surface of the reel hub on the top surface of the bottom of the reel hub, thereby avoiding the deterioration of the flatness of the outer peripheral surface of the reel hub caused by the integral molding of the reel hub and the position restriction rib.

In the present invention, the position restriction rib can be independently formed on the bottom of the reel hub, or can be disposed on the outer peripheral surface of a geared wall which is uprightly disposed on the bottom of the reel hub and has at the top end a gear section which engages with the reel lock member.

According to the magnetic tape cartridge of the present invention, the position restriction rib which restricts the axial deviation of the reel lock member from the axial position of the tape reel is formed discontinuously with the inner peripheral surface of the reel hub on the top surface of the bottom of the reel hub, whereby the deviation in axial position between the tape reel and the reel lock member due to dropping impact and the like can be prevented and a constantly appropriate chucking operation can be ensured.

In addition, it is possible to avoid the deformation of magnetic tape due to the deterioration of the flatness of the outer peripheral surface of the reel hub and the axial shaking and the like of the reel hub during rotation thereof, whereby the running stability of magnetic tape can be improved.

DESCRIPTION OF THE EMBODIMENT

An embodiment of the present invention will be described below with reference to FIGS. 1 to 6.

Figure 1:
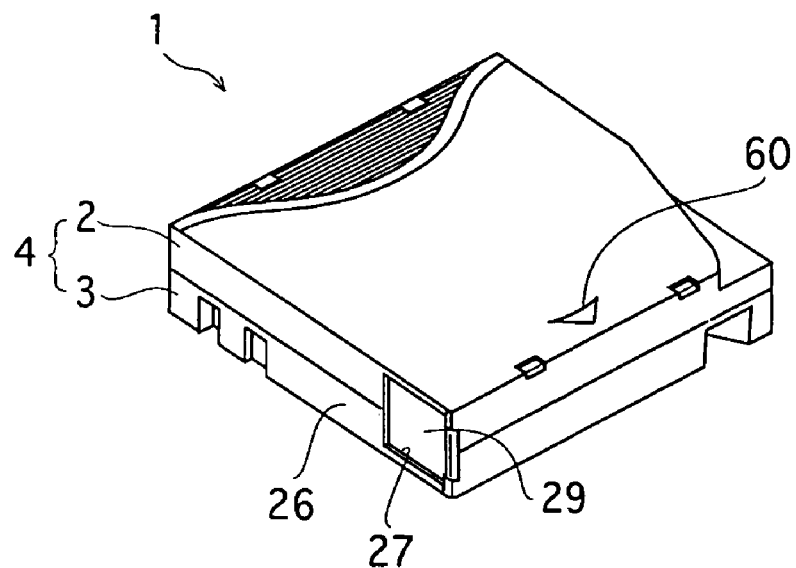
FIG. 1 is a general perspective view of a magnetic tape cartridge according to an embodiment of the present invention.
Figure 2:
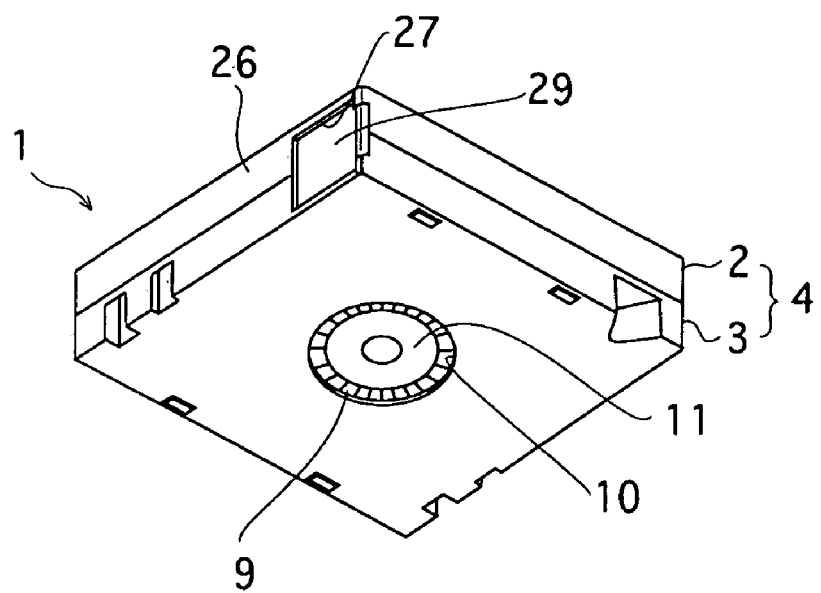
FIG. 2 is a general perspective view of the magnetic tape cartridge according to the embodiment of the present invention as viewed from the bottom side thereof.
Figure 3:
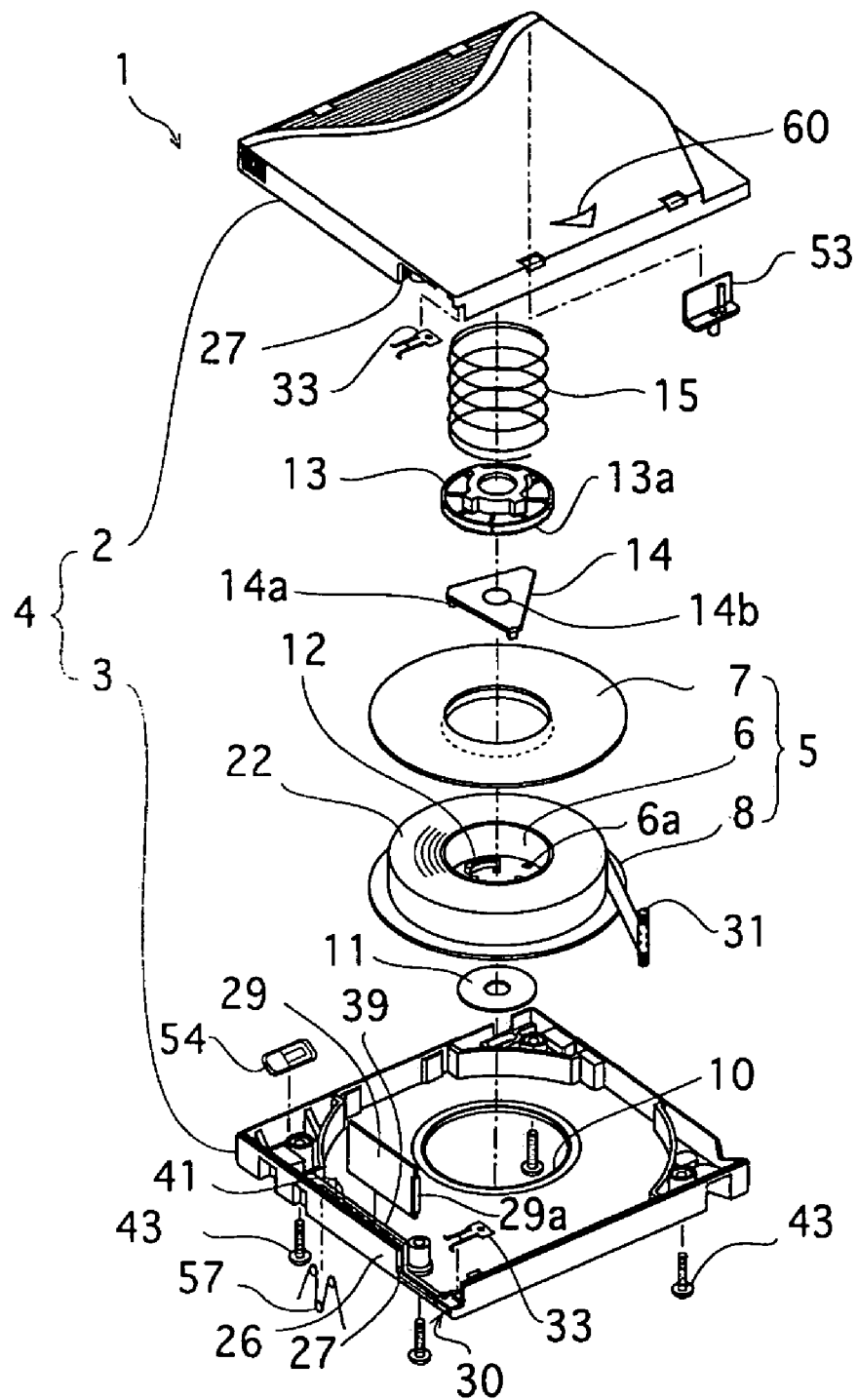
FIG. 3 is an exploded perspective view of the magnetic tape cartridge according to the embodiment of the present invention.

FIGS. 1 to 6 show the embodiment of the present invention. FIG. 1 is a general perspective view of a magnetic tape cartridge 1 according to the embodiment, FIG. 2 is a general perspective view of the magnetic tape cartridge 1 as viewed from the bottom side thereof, and FIG. 3 is an exploded perspective view of the magnetic tape cartridge 1.

The magnetic tape cartridge 1 has a construction in which a single tape reel 5 on which magnetic tape 22 is wound is rotatably housed in the inside of a cartridge case 4 formed by a top shell 2 and a bottom shell 3 which are joined together by a plurality of screw members 43. The tape reel 5 has a reel hub 6, a top flange 7 joined to the top end of the reel hub 6, and a bottom flange 8 formed integrally with the bottom end of the reel hub 6. Each of the reel hub 6, the top flange 7 and the bottom flange 8 is made of an injection molded product of synthetic resin material.

A chucking gear 9 which engages with a reel-rotating drive shaft of a tape drive apparatus (not shown) is formed in a ring-like shape at the center of the bottom of the tape reel 5, and is exposed to the outside via an opening 10 formed in the center of the bottom shell 3 (FIG. 2). On the inner peripheral side of the chucking gear 9, a ring-shaped metal plate 11 for magnetically securing the tape reel 5 to the reel-rotating drive shaft is fixed to the outside surface of the bottom of the reel hub 6 by insert molding.

A reel spring 15, a reel lock member 13 and a spider 14 are disposed between the inside surface of the top shell 2 and the tape reel 5 so as to constitute a reel lock mechanism which inhibits the rotation of the tape reel 5 when the magnetic tape cartridge 1 is not in use. The details of this reel lock mechanism will be described later.

One side wall 26 of the cartridge case 4 is provided with a tape outlet which permits one end of the magnetic tape 22 to be drawn out from the cartridge case 4. A side wall 39 which is opposed to the side wall 26 across a predetermined distance is formed inside the side wall 26, and a guide groove 41 which guides the movement of a slide door 29 to open and close the tape outlet 27 is formed by the side wall 26 and the side wall 39. Although not shown, the guide groove 41 is constructed in a similar form on the top shell 2 as well as the bottom shell 3.

An engagement section 29a which engages with a tape transport mechanism of the tape drive apparatus to open the slide door 29 is disposed at one side edge of the slide door 29. A W-shaped torsion spring 57 which urges the slide door 29 toward a closed position is housed in the guide groove 41.

A safety tub 53 for preventing erroneous erasure of information recorded on the magnetic tape 22 is slidably secured inside another side wall of the cartridge case 4, and an IC board 54 for reading and writing in a non-contact manner content related to information recorded on the magnetic tape 22 is slantly disposed inside another sidewall of the cartridge case 4.

Furthermore, a mark 60 which indicates the direction in which the magnetic tape cartridge 1 is to be inserted into the tape drive apparatus is disposed in the front side of the top surface of the top shell 2.

A metal-made leader pin 31 is fixed to one end of the magnetic tape 22. This leader pin 31 is detachably attached to a pin holding section 30 disposed inside the tape outlet 27. The pin holding section 30 includes elastic holders 33 which are secured vertically symmetrically with respect to the top-wall inside surface of the cartridge case 4 (the inside surface of the top shell 2) and the bottom-wall inside surface of the cartridge case 4 (the inside surface of the bottom shell 3). The leader pin 31 is supported at the top and bottom ends by the elastic holders 33.

Figure 4:
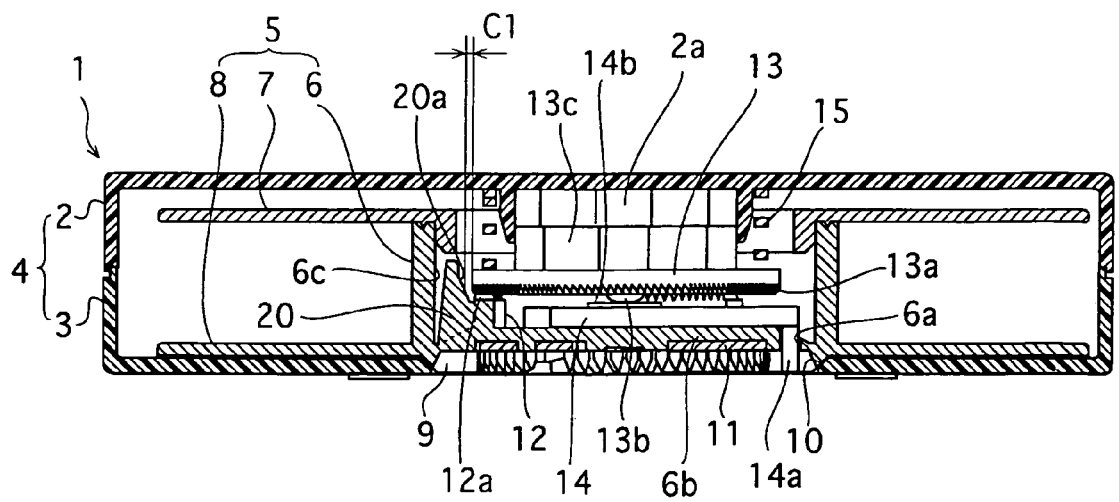
FIG. 4 is a cross-sectional side view of the essential sections of the magnetic tape cartridge according to the embodiment of the present invention which is not in use.
Figure 5:
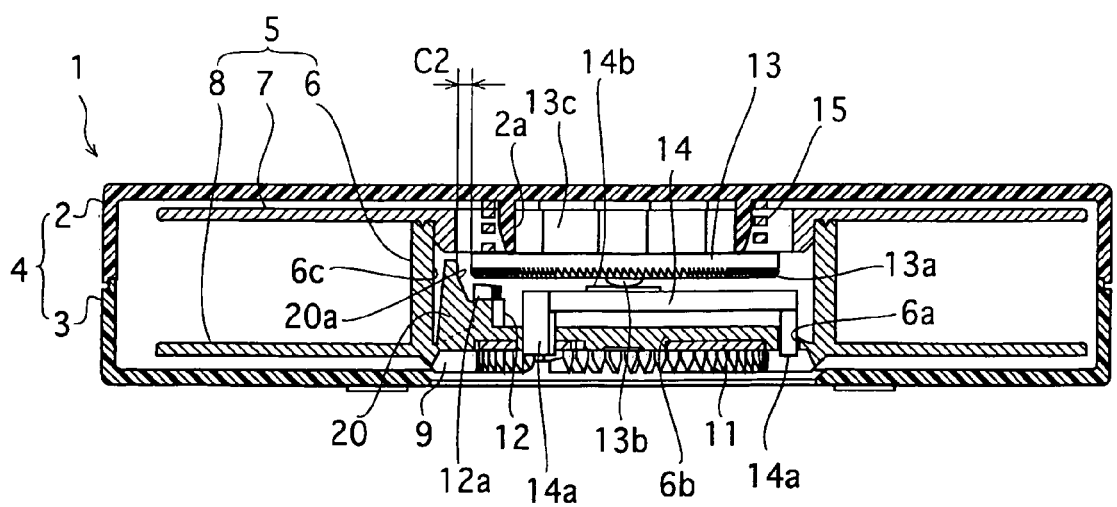
FIG. 5 is a cross-sectional side view of the essential sections of the magnetic tape cartridge according to the embodiment of the present invention which is in use.
Figure 6:
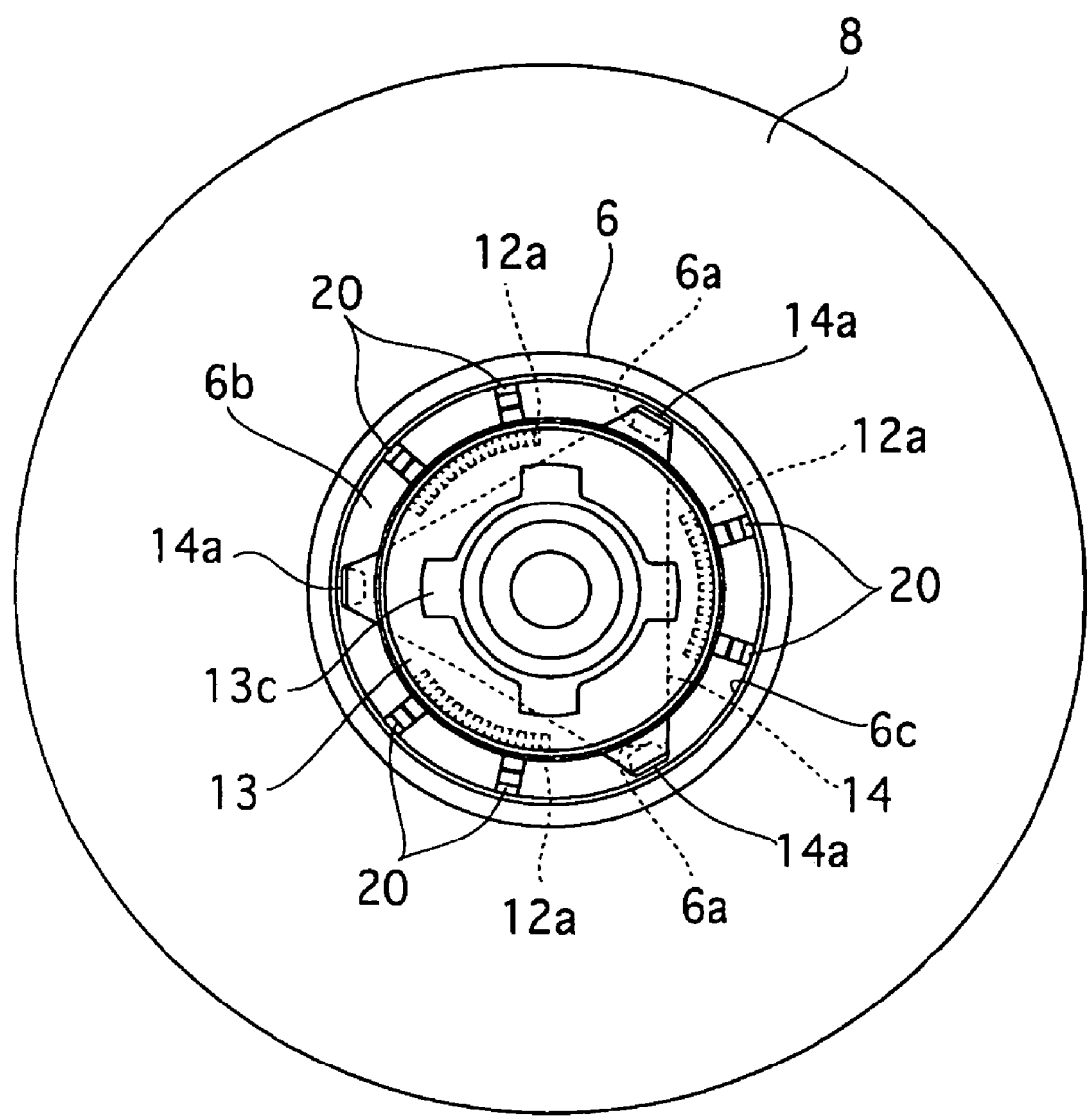
FIG. 6 is a top plan view showing the inside of a reel hub according to the embodiment of the present invention in which a reel lock mechanism is constructed.
Figure 7:
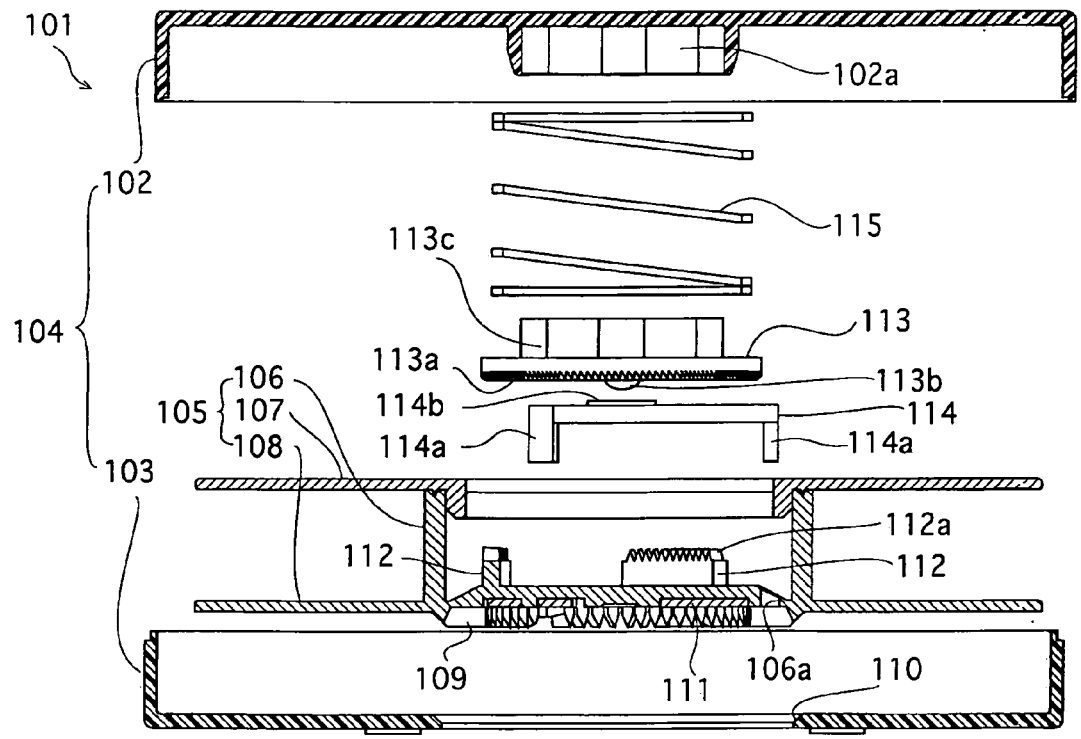
FIG. 7 is an exploded cross-sectional side view of a related art magnetic tape cartridge.
Figure 8:
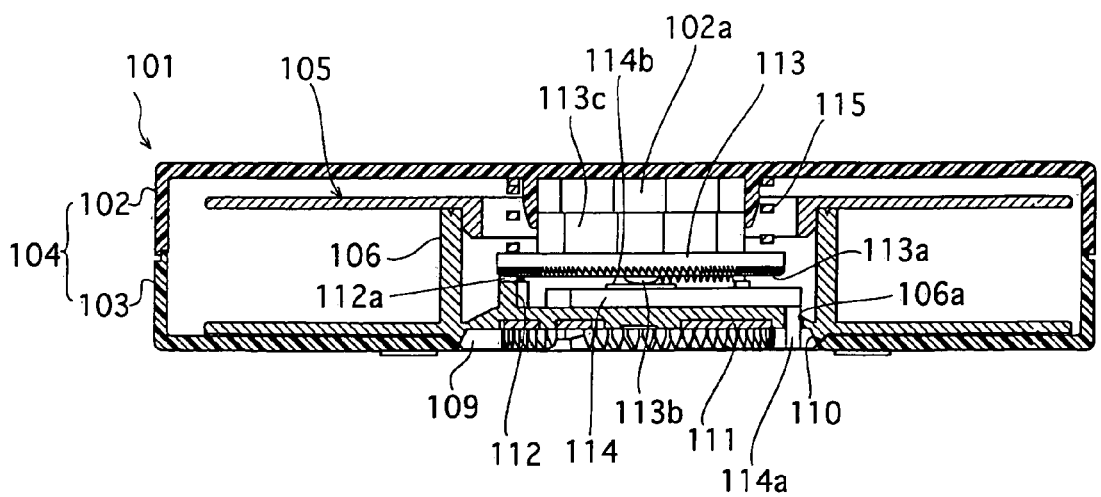
FIG. 8 is an exploded cross-sectional side view of the essential sections of the related art magnetic tape cartridge which is not in use.
Figure 9:
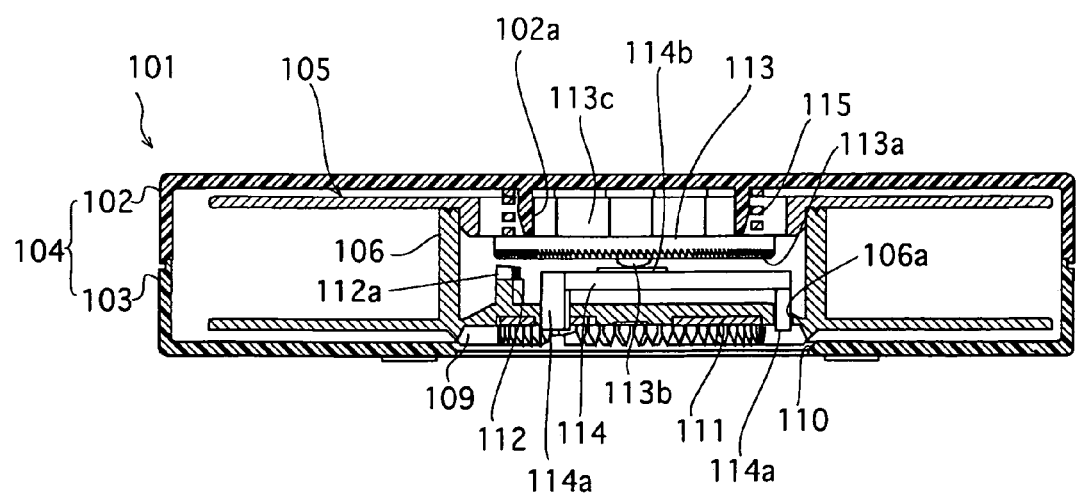
FIG. 9 is an exploded cross-sectional side view of the essential sections of the related art magnetic tape cartridge which is in use.
Figure 10:
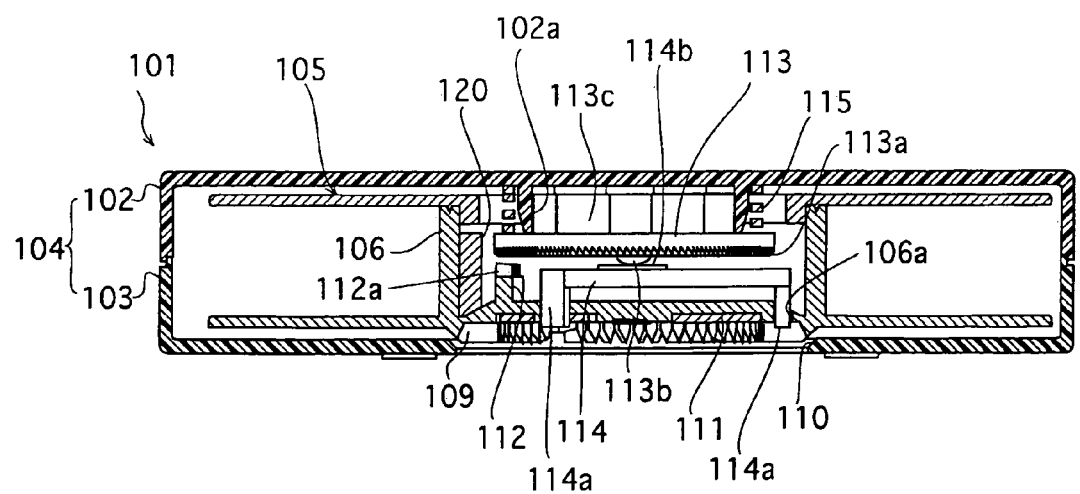
FIG. 10 is an exploded cross-sectional side view of the essential sections of another related art magnetic tape cartridge which is in use.

The reel lock mechanism of the tape reel 5 will be described below with reference to FIGS. 4 to 6. FIG. 4 is a cross-sectional side view of the essential sections of the magnetic tape cartridge 1 which is not in use, FIG. 5 is a cross-sectional side view of the essential sections of the magnetic tape cartridge 1 which is in use, and FIG. 6 is a top plan view showing the inside of the reel hub 6 in which the reel lock mechanism is constructed. In FIGS. 4 and 5, the illustration of the magnetic tape 22 is omitted.

The reel lock mechanism for inhibiting the rotation of the tape reel 5 when the magnetic tape cartridge 1 is not in use is provided in the inside of the reel hub 6. The reel lock mechanism includes geared walls 12 formed to extend uprightly from the top surface of a bottom 6b of the reel hub 6, a lock member 13 having engagement teeth 13a which mesh with gear sections 12a formed on the top ends of the respective geared walls 12, a spider (reel lock release member) 14 for releasing the engagement of the geared walls 12 and the reel lock member 13, and a reel spring 15 disposed between the inside surface of the top shell 2 and the top surface of the reel lock member 13 and operative to urge the tape reel 5 toward the bottom shell 3 via the reel lock member 13.

The geared walls 12 have arc-like shapes as viewed in top plan view, and are respectively formed on the top surface of the bottom 6b of the reel hub 6 at three locations spaced equidistantly apart from one another around the same circumference centered at the axis of the reel hub 6 (FIG. 6). The reel lock member 13 has a circular shape as viewed in top plan view, and engagement teeth 13a are formed on the bottom surface of the reel lock member 13 in a ring-like shape as viewed in top plan view so as to be opposed to the gear sections 12a of the geared walls 12. A fitting projection 13c which has an approximately cross-like shape as viewed in top plan view is formed on the top surface of the reel lock member 113 (FIG. 6), and a fitting recess 2a which has an approximately cross-like shape as viewed in top plan view and in which the fitting projection 13c is fitted is formed at an approximately central section of the inside surface of the top shell 102. The reel lock member 13 can be moved along the fitting recess 2a in the axial direction of the tape reel 5 (in the thickness direction of the magnetic tape cartridge 1), but the relative movement of the reel lock member 13 in the rotating direction thereof is restricted.

The reel spring 15 is made of a coil spring, and one end of the reel spring 15 is engaged with the periphery of the fitting recess 2a on the inside surface of the top shell 2, while the other end is engaged with the periphery of the fitting projection 13c on the top surface of the reel lock member 13. The reel spring 15 constantly urges the reel lock member 13 in the direction in which the engagement teeth 13a of the reel lock member 13 is brought into engagement with the gear sections 12a of the geared walls 12.

The spider 14 has an approximately triangular shape (FIG. 6), and is disposed between the bottom 6b of the reel hub 6 and the reel lock member 13. A total of three legs 14a are formed on the bottom surface of the spider 14 so as to project downwardly from three vertices of the approximately triangular shape of the spider 14, respectively. When the magnetic tape cartridge 1 is not in use, the three legs 14a are inserted in position between gears of the chucking gear 9 via insertion holes 6a formed in the bottom 6b of the reel hub 6. A support surface 14b which supports a sliding contact section 13b having an arc-like cross-sectional shape formed to project from an approximately central section of the bottom surface of the reel lock member 13 is disposed on an approximately central section of the top surface of the spider 14.

When the magnetic tape cartridge 1 is not in use, the reel lock member 13 is located at a lock position as shown in FIG. 4. At this lock position, the reel lock member 13 presses the tape reel 5 against the bottom shell 3 by the urging force of the reel spring 15, and brings the engagement teeth 13a of the reel lock member 13 into engagement with the gear sections 12a of the geared walls 12, thereby inhibiting the rotation of the tape reel 5.

On the other hand, when the magnetic tape cartridge 1 is in use, the reel-rotating drive shaft of the tape drive apparatus which is not shown is brought into engagement with the chucking gear 9, whereby the legs 14a of the spider 14 inserted in position between gears of the chucking gear 9 are pressed upwardly into the inside of the cartridge case 4. Accordingly, the reel lock member 13 is moved to the lock release position shown in FIG. 5 against the urging force of the reel spring 15, so that the engagement between the gear sections 12a and the engagement teeth 13a is released.

Then, the tape reel 5 is integrated with the reel-rotating drive shaft by the action of magnetic attraction between the metal plate 11 and the reel-rotating drive shaft, whereby the tape reel 5 is rotationally driven via the chucking gear 9. At this time, the rotational operation of the reel lock member 13 is restricted by the action of fitting between the fitting projection 13c and the fitting recess 2a of the top shell 2, and the spider 14 rotates together with the tape reel 5 by means of a sliding contact action produced by the state of point contact between the support surface 14b disposed on the top surface of the spider 14 and the sliding contact section 13b of the reel lock member 13.

In addition, in the embodiment, position restriction ribs 20 which are opposed to the periphery of the reel lock member 13 and restrict the axial deviation of the reel lock member 13 from the axial position of the tape reel 5 are provided in the inside of the reel hub 6. These position restriction ribs 20 are formed discontinuously with an inner peripheral surface 6c of the reel hub 6 on the top surface of the bottom 6b of the reel hub 6 (FIG. 4).

A plurality of position restriction ribs 20 are formed to extend uprightly from the top surface of the bottom 6b of the reel hub 6 on the outer peripheral side of the geared walls 12. In the present embodiment in particular, the position restriction ribs 20 are arranged at two positions adjacent to the outer peripheral surface of each of a total of three geared walls 12, i.e., radially at a total of six positions (FIGS. 4 and 6), but the number of the position restriction ribs 20 formed is not limited to this example. In addition, since the position restriction ribs 20 are arranged adjacently to the outer peripheral surfaces of the geared walls 12, the strength of the position restriction ribs 20 can be increased.

In addition, each individual one of the position restriction ribs 20 has a sufficient strength (cross-sectional area and side surface shape) to withstand impact applied from the tape reel 5, and the position in which each of the position restriction ribs 20 is formed is set so that the position restriction ribs 20 can restrict the position of the tape reel 5 in whichever direction the tape reel 5 moves.

Each of the position restriction ribs 20 is formed to extend to a height position opposing the periphery of the reel lock member 13 which is located at the lock release position shown in FIG. 5. Accordingly, when dropping impact acts on the magnetic tape cartridge 1 which is not in use, even if the tape reel 5 moves in a horizontal direction relative to the cartridge case 4, further movement of the tape reel 5 is restricted by the action of abutment between the position restriction ribs 20 integral with the tape reel 5 and the periphery of the reel lock member 13. Thus, the deviation between the axis of the tape reel 5 and the axis of the reel lock member 13 can be restrained.

In the present embodiment, each of the position restriction ribs 20 has a shape selected so that a clearance C2 between the position restriction ribs 20 and the reel lock member 13 at the lock release position shown in FIG. 5 becomes larger than a clearance C1 between the position restriction ribs 20 and the reel lock member 13 at the lock position shown in FIG. 4. In this embodiment, a taper section 20a is formed on the inner periphery of each of the position restriction ribs 20 so as to ensure the strength of the position restriction ribs 20.

The sizes of the respective clearances C1 and C2 are not particularly limitative, and can be arbitrarily selected according to required specifications and the like. As one example, when the gear pitch of the engagement teeth 13a of the reel lock member 13 is over 1 mm and the running clearance of the tape reel 5 is 0.5 mm when the magnetic tape cartridge 1 is in drive mode (in use), if the size of the clearance C2 is selected to satisfy the relationship of:

$$0.5 \text{ mm} < C2 < 1 \text{ mm},$$

it is possible to restrict the horizontal movement of the tape reel 5 that is not less than one gear pitch of the engagement teeth 13a, while ensuring the running clearance of the tape reel 5. Namely, it is possible to restrain the amount of deviation between the axis of the tape reel 5 and the axis of the reel lock member 13 to not greater than one gear pitch (1 mm) of the engagement teeth 13a.

The position restriction ribs 20 are formed integrally with the top surface of the bottom 6b of the reel hub 6, and are formed from the constituent resin material of the reel hub 6 at the same time as the reel hub 6 (and the bottom flange 8). At this time, the position restriction ribs 20 are formed independently from the inner peripheral surface 6c of the reel hub 6, i.e., discontinuously with the inner peripheral surface 6c, whereby molding defects such as sink marks are prevented from occurring on the outer peripheral side of the reel hub 6 at locations corresponding to the formation positions of the position restriction ribs 20.

Accordingly, it is possible to ensure a predetermined flatness of the outer peripheral surface of the reel hub 6, whereby it is possible to prevent deformation and the like of the magnetic tape 22 wound on the reel hub 6. In addition, since it is possible to avoid the deterioration of the roundness of the reel hub 6, the tape reel 5 can be prevented from causing rattling, axial shaking and the like during high-speed rotation, whereby stable runnability of the magnetic tape 22 can be ensured.

As described hereinabove, according to the present embodiment, the position restriction ribs 20 which restricts the axial deviation of the reel lock member 13 from the axial position of the tape reel 5 is formed on the top surface of the bottom 6b of the reel hub 6 discontinuously with the inner peripheral surface 6c of the reel hub 6, whereby the deviation in axial position between the tape reel 5 and the reel lock member 13 due to dropping impact and the like can be prevented to ensure a constantly appropriate chucking operation.

In addition, it is possible to avoid the deformation of the magnetic tape 22 due to the deterioration of the flatness of the outer peripheral surface of the reel hub 6 and the axial shaking of the reel hub 6 during rotation thereof, whereby the running stability of the magnetic tape 22 can be improved.

Although the above description has referred to one embodiment of the present invention, the present invention, of course, is not limited to this embodiment, and can be modified in various ways on the basis of the technical idea of the present invention.

For example, although in the above-mentioned embodiment the position restriction ribs 20 are formed adjacently to the outer peripheral surfaces of the geared walls 12, this construction is not limitative, and the position restriction ribs 20 may also be independently formed adjacently to only the bottom 6b of the reel hub 6.

In addition, the position restriction ribs 20 can, of course, be formed as a position restriction rib which extends in an arc-like shape around the peripheral direction of the reel hub 6, and the formation length of the position restriction ribs maybe increased within the range in which the moldability of the position restriction rib is not impaired. In addition, a plurality of position restriction ribs having such an arc-like shape may also be disposed.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic tape cartridge, comprising:
a tape reel on which magnetic tape is wound on an outer peripheral surface of a reel hub thereof, rotatably housed inside of a cartridge case; and
a reel lock member, for inhibiting rotation of said tape reel, provided movably in an axial direction of said tape reel between a lock position and a lock release position, provided inside of said reel hub,
wherein a position restriction rib, opposed to an outer peripheral surface of said reel lock member, for restricting an axial deviation of said reel lock member from an axial position of said tape reel, is formed discontinuously with an inner peripheral surface of said reel hub on a top surface of a bottom of said reel hub, provided inside of said reel hub,
wherein the position restriction rib has a cross-sectional area and a side surface shape with sufficient strength to withstand impact applied from said tape reel,
wherein the position restriction rib extends to a height position opposing the outer peripheral surface of said reel lock member which is located at said lock release position, and
wherein the position restriction rib is formed independently from the inner peripheral surface of said reel hub, whereby molding defects are prevented from occurring on the outer peripheral surface of said reel hub at location corresponding to formation position of the position restriction rib.

2. The magnetic tape cartridge according to claim 1, wherein a geared wall having at a top end of a gear section engaging with said reel lock member is formed on the top surface of the bottom of said reel hub; and
wherein position restriction ribs are arranged continuously to an outer peripheral surface of said geared wall.

3. The magnetic tape cartridge according to claim 1, wherein said position restriction rib has a shape selected so that a clearance between said position restriction rib and said reel lock member at the lock release position becomes larger than a clearance between said position restriction rib and said reel lock member at the lock position.

* * * * *